United States Patent [19]

Ishida et al.

[11] 4,427,278
[45] Jan. 24, 1984

[54] FLASH PHOTOGRAPHY SYSTEM AND ELECTRONIC FLASH DEVICE FOR USE IN THE SYSTEM

[75] Inventors: Tokuji Ishida, Daito; Hiroshi Hosomizu, Sakai, both of Japan

[73] Assignee: Minolta Camera Kabushiki Kaisha, Osaka, Japan

[21] Appl. No.: 432,442

[22] Filed: Oct. 4, 1982

[30] Foreign Application Priority Data

Oct. 5, 1981 [JP] Japan .............................. 56-159145

[51] Int. Cl.³ ........................ G03B 15/05; G03B 17/18
[52] U.S. Cl. ............................ 354/416; 354/127.12; 354/418; 354/465
[58] Field of Search .......................... 354/33, 127, 128

[56] References Cited
U.S. PATENT DOCUMENTS 4,295,717 10/1981 Kitagawa .............................. 354/128

*Primary Examiner*—Russell E. Adams
*Attorney, Agent, or Firm*—Watson, Cole, Grindle & Watson

[57] ABSTRACT

A flash photography system includes an electronic flash device capable of light measurement for automatic flash light control and a camera capable of automatic shutter speed control at a daylight photography mode and at a flash photography mode. The flash device generates a flash readiness signal and a flash light control termination signal at a common terminal for the transmission of these signals to the camera through a corresponding common terminal, wherein these signals cause the camera to effect the automatic shutter speed control at the flash photography mode. The camera generates an interrupting signal at the corresponding terminal in response to a camera release operation and the electronic flash device interrupts the generation of the flash light control termination signal in response to the interrupting signal. In indicator which makes an indication in response to the flash readiness signal and the flash light control termination signal respectively is also provided in the camera.

9 Claims, 3 Drawing Figures

FLASH PHOTOGRAPHY SYSTEM AND ELECTRONIC FLASH DEVICE FOR USE IN THE SYSTEM

BACKGROUND OF THE INVENTION

1. Field of the Invention

The present invention relates to a flash photography system and an electronic flash device for use in the system which transmits a flash readiness signal and a flash light control termination signal from the electronic flash device to a camera and switches the camera photography mode and/or its indication in accordance with the signals.

2. Description of the Prior Art

A Japanese Laid-Open Patent Application No. Sho 54-24625 discloses a flash photography system wherein an electronic flash device generates a flash readiness signal upon detecting that its main capacitor is fully charged, i.e., that it is ready to fire and when the flash readiness signal is transmitted to a camera, the camera is automatically switched to a flash photography mode which controls the shutter at a shutter speed tuned to the flash of the electronic flash device and, at the same time, an indication of the camera being switched to the flash photography mode is given in the camera viewfinder. That flash photography system also transmits a flash light control termination signal from the electronic flash device, upon termination of automatic flash light control, to the camera and indicates, in response to the signal, the flash light control termination in the camera viewfinder. In the system, both the flash readiness signal and the flash light control termination signal are transmitted from the electronic flash device to the camera through the separate terminals. However, providing the separate terminals between the electronic flash device and the camera for transmission of the two signals is not desirable in that it increases not only cost but also the frequency of terminal contact failure. Therefore, a desirable system is that it usually transmits a flash readiness signal from an electronic flash device to a camera through one terminal and transmits a flash light control termination signal through the same terminal for a predetermined period of time only upon termination of automatic flash light control so that re-transmission of the flash readiness signal is possible after the lapse of the predetermined period. Thus it reduces the number of terminals between the electronic flash device and the camera. However, such a system poses a new problem. That is, only the flash light control termination signal is transmitted during the predetermined period of time upon termination of automatic flash light control by the electronic flash device, making it impossible for the camera to judge whether the main capacitor of the electronic flash device is fully charged, i.e., whether the electronic flash device is ready to fire. In other words, since the same terminal is used for transmission of the two signals, the camera cannot identify a signal appearing at the terminal even if it is a flash light control termination signal and judges instead that the electronic flash device is ready to fire. Therefore, in case another shooting is performed for repeated photography in short cycles during the predetermined period of time when a flash light control termination signal is transmitted, the camera misjudges that the electronic flash device is ready to fire before it is so and actuates switching to the flash photography mode. The result is an underexposed picture.

U.S. Pat. No. 4,349,260 discloses a flash photography system which eliminates the drawbacks of the above prior art system by use of a common terminal for the transmission of the flash readiness signal and the flash light control termination signal and a circuit for interrupting the generation of the flash light control termination signal in response to a camera release operation. This proposed system, however, employs a dedicated electronic flash device having no light receiving element for the flash light control, thereby necessitating a stop signal transmission from a camera to the flash device. In other words, the flash device is useful only for a camera capable of light measurement during an exposure operation and having an additional terminal for transmission of the stop signal for automatic flash light control.

SUMMARY OF THE INVENTION

It is accordingly an object of the present invention to provide a flash photography system of the above described type which reduces the number of signal transmission terminals and which does not require a camera capable of light measurement during an exposure operation.

Another object of the present invention is to provide an electronic flash device for use in the flash photography system.

To accomplish these objects, an electronic flash device for use in the flash photography system of the present invention includes a light receiving means which receives a light reflected from an object or a scene, an automatic flash light control means which generates a stop signal for stopping firing of a flash tube when integration of the light received by the light receiving means reaches a predetermined level, a detection means which generates a detection signal when a main capacitor is charged to a predetermined level, i.e., when the flash device is ready for flash photography, a flash readiness signal generating means for generating a flash readiness signal in response to the detection signal, a flash light control termination signal generating means for generating a flash light control termination signal in response to the stop signal and a terminal for common transmission of the flash readines signal and the flash light control termination signal. On the other hand, a camera for use in the flash photography system includes a terminal connectable to the terminal of the flash device and an automatic exposure control means capable of automatic shutter speed control at a daylight photography mode and at a flash photography mode and/or an indication means capable of making an indication. The flash readiness signal and the flash light control termination signal cause the automatic exposure control means to effect the automatic shutter speed control in the flash photography mode respectively and/or causes the indication means to make an indication. Additionally, the camera further includes an interrupting signal generating means for generating an interrupting signal at the terminal of the camera in response to a camera release operation and the flash device further includes a control means for causing the flash light control termination signal generating means to interrupt the generation of the flash light control termination signal in response to the interrupting signal transmitted to the terminal of the flash device.

According to the flash photography system of the present invention, the common use of the terminal reduces the number of terminals to be provided on the camera and the flash device, and the camera is not required to have a light measurement capability during an exposure operation because the light receiving means is included in the flash device.

The above and other objects and features of the present invention will become more apparent from the following description of a preferred embodiment of the present invention taken in conjunction with the accompanying drawings.

DETAILED DESCRIPTION OF THE PREFERRED EMBODIMENT

Figure 1:
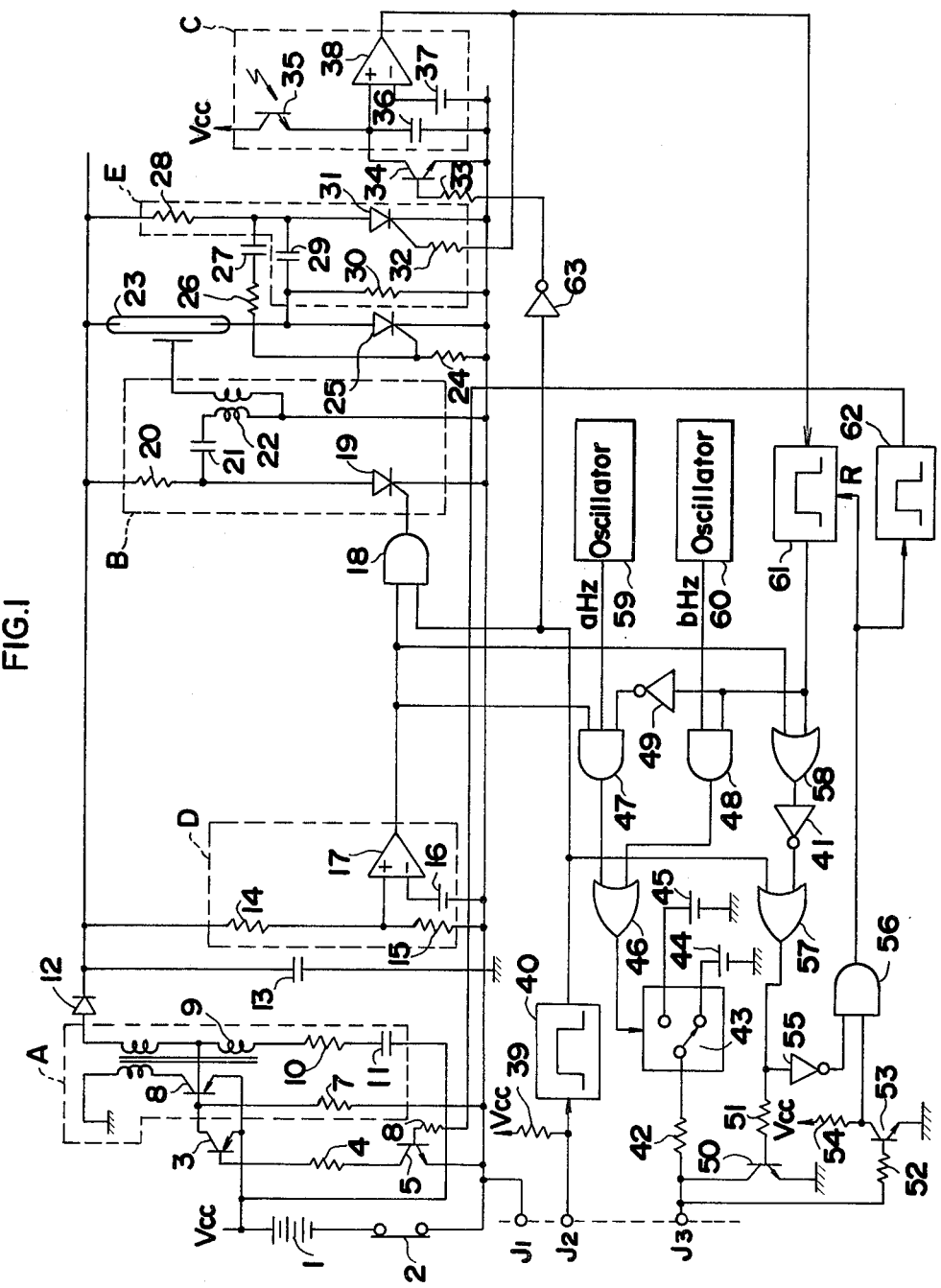
FIG. 1 is a circuit diagram schematically showing an electronic flash device of an embodiment of the present invention.
Figure 2:
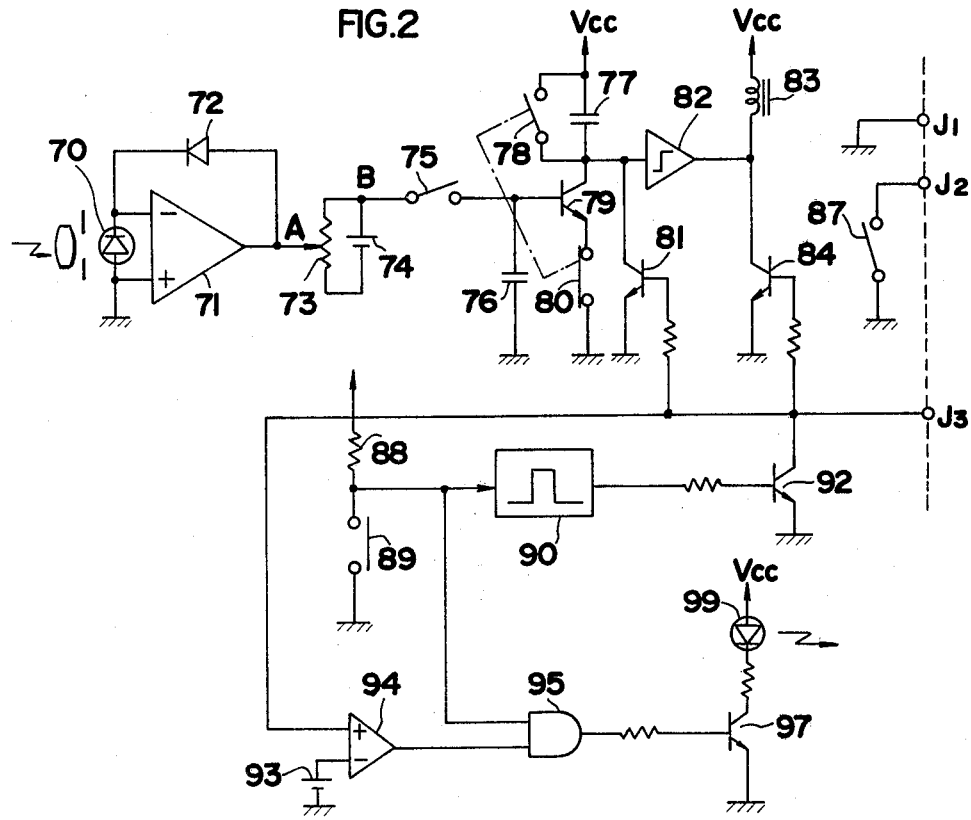
FIG. 2 is a circuit diagram of a camera for combined use with the electronic flash device of FIG. 1.
Figure 3:
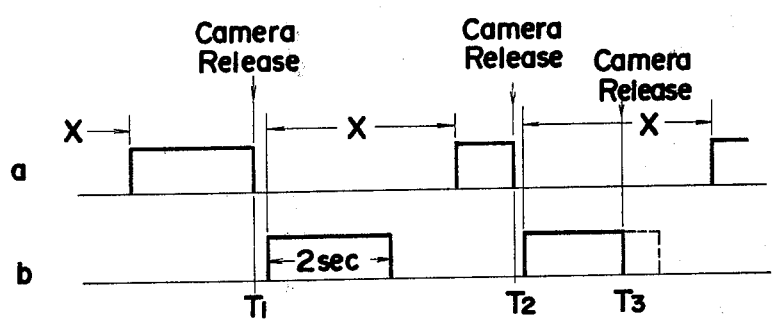
FIG. 3 is a time chart for a flash readiness signal and a flash light control termination signal.

FIG. 2, which shows a camera circuit in an embodiment of the present invention, includes synchronization terminals (X terminals) J1 and J2, synchronous switch 87 and terminal J3 which receives the flash readiness signal and the flash light control termination signal from an electronic flash device shown in FIG. 1. When the potential at terminal J3 is below 1 V, transistor 84 is OFF and the camera operates in the daylight photography mode. The flash readiness signal and the flash light control termination signal both input to terminal J3 are voltage signals which fluctuate between the levels of about 1 V and 2 V and differ only in frequency. Therefore, with these signals at terminal J3, transistors 81 and 84 are ON, and the camera operates in the flash photography mode. Provided inside the camera viewfinder is indicator 99 which flickers at different frequencies in response to the two kinds of signals and indicates the flash readiness and the flash light control termination. The flash light control termination signal appears for about 2 seconds upon termination of automatic flash light control. The camera should be set to the daylight photography mode at X intervals during which the main capacitor of an electronic flash device is being charged. When the second shooting is performed at the timing of T2 with a flash readiness signal after the first shooting, normal flash photography is possible. Assuming that the shutter is then released at the timing of T3 with a flash light control termination signal, a voltage between 1 V and 2 V is applied to terminal J3 which turns transistor 84 ON, causing the camera to operate in the flash photography mode in the same manner as when a flash readiness signal is applied to terminal J3. Therefore, according to the present invention, switch 89 is turned ON in response to the shutter release operation to trigger one shot circuit 90 for reverse transmission of an interrupting signal to the electronic flash device through terminal J3 to thereby stop the occurrence of a flash light control termination signal. In other words, the remaining portion of a flash light control termination signal shown by a dotted line in FIG. 3 is eliminated at the timing of T3 so that the camera is operated in the daylight photography mode.

With reference to FIG. 1, description will now be given of an electronic flash device circuit in accordance with an embodiment of the present invention, wherein power battery 1 is connected to well-known booster circuit A when power switch 2 is closed. The high voltage generated by the booster circuit operation is applied through rectifier diode 12 to main capacitor 13 which is thus charged. Resistors 14 and 15, constant-voltage power supply 16 and comparator 17 together constitute flash readiness detection circuit D. When the charged voltage at main capacitor 13 exceeds a predetermined value, the output of comparator 17 is inverted from its L to H level. Resistor 20, capacitor 21, transformer 22 and SCR 19 together form trigger circuit B for triggering xenon flash tube 23. When the output of AND gate 18 becomes an H level, trigger circuit B operates to actuate xenon flash tube 23. Resistors 28, 30 and 32, capacitor 29 and SCR 31 constitute flash-stop circuit E which stops the operation of xenon flash tube 23. Phototransistor 35, capacitor 36, constant-voltage power supply 37 and comparator 38 constitute automatic flash light control circuit C. When the voltage at the positive terminal of capacitor 36 charged with the photocurrent of phototransistor 35 which receives the reflected light from an object or scene, reaches a predetermined level given by constant-voltage power supply 37, the output of comparator 38 is inverted to an H level. Flashstop circuit E of the electronic flash device operates with the inverted output of comparator 38 to thereby stop the flash firing of the electronic flash device. The level given by constant voltage power supply 37 is manually set in accordance with the film speed of the used film and an aperture value set on the side of the camera.

Changeover switch circuit 43 is connected to constant-voltage power supply 44 for generating the 1 V level output and constant-voltage power supply 45 for generating the 2 V level output. When the output of OR gate 46 is at the H level, the output voltage of constant-voltage power supply 44 is generated from changeover switch circuit 43. When the output of OR gate 46 is at the L level, the output voltage of constant-voltage power supply 45 is generated from changeover switch circuit 43. On shot circuit 40 is triggered when input terminal J2 is short-circuited to ground to generate the H level one shot pulse at the time duration of approximately 10 m Sec. Transistor 50 is turned ON with the output of OR gate 57 becoming an H level when no voltage above the 1 V level is output at terminal J3, thereby short-circuiting terminal J3 to ground. Resistors 52 and 54, transistor 53, inverter 55 and AND gate 56 together constitute a detection circuit which detects that terminal J3 is short-circuited from the camera. When terminal J3 is short-circuited from the camera while transistor 50 is turned OFF to output the voltage above the 1 V level from terminal J3, the output of AND gate 56 becomes an H level, whereby one shot circuit 62 is triggered to output a one shot H level pulse for a predetermined period of time. This pulse time duration is set to that from the shutter release operation to the full shutter aperture and is normally 10˙m Sec. One shot circuit 61 is triggered upon termination of automatic flash light control by the electronic flash device to output the one shot pulse voltage of an H level for about 2 seconds.

When the charged voltage of main capacitor 13 exceeds a predetermined level after power switch 2 has been closed, the output of comparator 17 is inverted to an H level, and the outputs of AND gate 47 and OR gate repeat the H and L level oscillations at the frequency of a Hz in response to the output of oscillator 59 which oscillates at the frequency of a Hz. Generated from changeover switch circuit 43 is the voltage which oscillates alternately at the 1 V and 2 V levels in response to the output of OR gate 46 for transmission as a flash readiness signal to a camera through terminal J3. When the camera shutter is released, transistor 92 is turned ON for about 1 m Sec. with the output pulse of one shot circuit 90, whereby terminal J3 at the camera side is short-circuited to ground to trigger one shot circuit 62 which outputs the H level voltage for a predetermined period of time. This signal turns transistors 3 and 5 ON, whereby booster circuit A of the electronic flash device stops operating, thereby suspending charging main capacitor 13. This stop operation is performed to prevent a camera control circuit from malfunctioning due to noise occurring in the booster circuit of the electronic flash device. Next when terminal J2 at the camera side is short-circuited to ground after the leading shutter curtain has traveled and switch 84 has been closed at full shutter opening, one shot circuit 40 is triggered to output the one shot pulse. With the one shot pulse, the output of AND gate 18 becomes an H level, whereby xenon flash tube 23 is triggered by trigger circuit B to fire, while SCR 25 is conductive by resistors 24 and 26 and capacitor 27 to thereby maintain xenon flash tube 23 operable. While the output of one shot circuit 40 remains at the H level, the output of OR gate 57 is at the H level, whereby transistor 50 is turned ON and the potential at terminal J3 is the same as that of ground. When the output of one shot circuit 40 is inverted to an H level, the output of inverter 63 becomes an L level, causing transistor 34 to be turned OFF, whereby capacitor 36 inside automatic flash light control circuit C starts to be charged. When the voltage at the positive terminal of capacitor 36 reaches a potential level predetermined by constant-voltage power supply 37 after the electronic flash device has continued to be operated, the output of comparator 38 becomes an H level, whereby the firing of the electronic flash device is stopped by flash-stop circuit E. Similarly, the H level output of comparator 38 is a stop signal and causes one shot circuit 61 to be triggered to output the H level one shot pulses for 2 seconds. With this pulse output from one shot circuit 61, the output of AND gate 47 becomes an L level through inverter 48, and the output of oscillator 60 which oscillates at the frequency of b Hz is generated from AND gate 48 and OR gate 46. As a result, changeover switch circuit 43 outputs the voltage which alternately changes to the 1 V and 2 V levels in response to the output of OR gate 46. This voltage output is transmitted as a flash light control termination signal to the camera through terminal J3. When the next camera shutter release operation is performed after the lapse of time determined by one shot circuit 61, a flash light control termination signal with the time duration of b Hz is output from terminal J3. After the lapse of that time duration, a flash readiness signal at the frequency of a Hz is then output from terminal J3 when main capacitor 13 of the electronic flash device is fully charged. When main capacitor 13 of the electronic flash device is not fully charged, transistor 50 turns ON and the output whose potential is identical to that of ground is generated at terminal J3.

Next when the camera shutter release operation is performed within the time duration determined by one shot circuit 61, one shot circuit 90 outputs the one shot pulse for a duration of about 1 m Sec. after switch 89 has been closed in response to the camera shutter release operation. After a time duration of about 1 m Sec., transistor 92 turns ON, whereby terminal J3 at the camera side is short-circuited to ground. Therefore, transistor 53 is turned OFF, causing the output of AND gate 56 to become an H level, whereby one shot circuit 61 is reset, and a flash light control termination signal at a frequency of b Hz is not output from terminal J3. When, at this time, main capacitor 13 of the electronic flash device has already been charged, a flash readiness signal at a frequency of a Hz is output at terminal J3, and if not, terminal J3 is short-circuited to ground.

Referring further to the circuitry of FIG. 2, photovoltaic element 70 receives the light reflected from an object or scene and transmitted through the aperture of an objective lens and is connected to operational amplifier 71 with a high input impedance. Under the action of diode 72, operational amplifier 71 outputs the logarithmic compression voltage of a measured light equivalent to Bv-Av, for example, in the APEX notation, wherein Bv represents luminance values and Av aperture value. Sliding resistor 73 having slider A and connected to both ends of constant-voltage power supply 74 is used to set film sensitivity, and outputs the voltage equivalent to Bv+Sv−Av from node B. Sv is the set value of film sensitivity. Memory switch 75 is turned OFF immediately before the mirror (not shown) of a single-lens reflex camera is lifted, and with memory switch 75 OFF, the voltage at node B is stored into memory capacitor 76. Switch 80 is closed in synchronization with the start of the leading shutter curtain travel, while switch 78 is opened to turn on transistor 79 whose collector current actuates memory capacitor 77 to be charged. When the charged voltage at memory capacitor 77 reaches a predetermined level, the output of comparator 82 is inverted to an H level to deenergizes electromagnet 83 for holding the trailing shutter curtain, which then travels and the shutter is closed. When main capacitor 13 of the electronic flash device is not fully charged, the voltage at terminal J3 is identical in potential to ground, whereby transistors 81 and 84 are turned OFF and the shutter is automatically controlled to be at a shutter speed determined by the voltage at node B for shooting in the daylight photography mode. Switch 89 is closed in synchronization with the camera shutter release operation. One shot circuit 90 is triggered when switch 89 is closed to output the H level one shot pulse for a duration of about 1 m Sec., while transistor 92 is ON and terminal J3 is short-circuited to ground. Thus, the potential at terminal J3 drops to the ground level and this dropping of the potential becomes the interrupting signal. Constant-voltage power supply 93 outputs a voltage between the 1 V and 2 V levels. The output of comparator 94 whose negative input terminal is connected with the output of constant-voltage power supply 93 is inverted to an H level when the 2 V level voltage from the electronic flash device is input through terminal J3 to the camera. If, at this time, the camera shutter release operation is not performed, i.e., if switch 89 is not closed, the output of AND gate 95 is similarly inverted to an H level, whereby transistor 97 turns ON and indicating light-emitting diode 99 illuminates. When conversely the 1 V level voltage is transmitted through terminal J3 to the camera, the output of comparator 94 becomes an L level, causing LED 99 to go off. Therefore, when a flash readiness signal which alternately oscillates at the 1 V and 2 V levels at the frequency of a Hz is transmitted through terminal J3 to the camera, LED 99 flashes at a Hz. When a flash light control termination signal which alternately oscillates between the 1 V and 2 V levels at the frequency of b Hz is transmitted through terminal J3 to the camera, LED 99 flashes at b Hz.

A camera indicator switch (not shown), i.e., a switch for connecting power supply Vcc to LED 99, is assumed to be ON. When a flash readiness signal is input from the electronic flash device to the camera through terminal J3, LED 99 flashes at the frequency of a Hz, whereby a photographer knows that main capacitor 13 of the electronic flash device has been fully charged. Next, with the camera shutter release operation, switch 89 is closed, causing LED 99 to go off and transistor 92 to run ON for about 1 m Sec., during which terminal J3 is short-circuited to ground. Memory switch 74 is then turned OFF immediately before the mirror of a single-lens reflex camera is moved, and the voltage at node B is stored into memory capacitor 76.

Next in synchronization with the start of the leading shutter curtain travel, switch 80 is closed and switch 78 is opened. At this time, voltages of the 1 V and 2 V levels are alternately input from the electronic flash device to terminal J3 as a flash readiness signal, whereby transistor 81 is ON and capacitor 77 is instantly charged to a predetermined potential with the collector current of transistor 81 and the output of comparator 82 inverted to an H level. However, transistor 84 is also ON, whereby electromagnet 83 for holding the trailing shutter curtain is energized to maintain the shutter curtain restraint. When the shutter is fully opened, switch 87 in ON to make terminal J3 identical in potential to ground, whereby the electronic flash device begins to fire. With the firing of the electronic flash device, i.e., the discharge of main capacitor 13, the output of comparator 17 becomes an L level, causing the flash readiness signal to disappear from terminal J3. One shot circuit 40 outputs the one shot pulse simultaneously with the firing of the electronic flash device, whereby transistor 50 turns ON and the potential at terminal J3 is identical to that of ground for about 10 m Sec. Therefore, transistor 84 is turned OFF and electromagnet 83 is deenergized, whereby the trailing shutter curtain travels and the shutter is closed.

Next, with the automatic flash light control by the electronic flash device terminated, the output of comparator 38 becomes an H level, whereby one shot circuit 61 is triggered to transmit a flash light control termination signal from the electronic flash device to the camera through terminal J3 for a predetermined period of time. As a result, LED 99 flashes at a frequency of b Hz and a photographer knows that the electronic flash device has terminated flash light control for correct exposure.

Since both the flash readiness signal and the flash light control termination signal are transmitted through terminal J3, simultaneous transmission of both signals is not possible. Therefore, when a flash light control termination signal is generated as described above, AND gate 47 is disabled through inverter 49 in response to the one shot pulse of one shot circuit 61, thereby generating a flash light control termination signal from terminal J3 by priority over a flash readiness signal.

What is claimed is:

1. A flash photography system including an electronic flash device and a camera, said electronic flash device comprising;
    a flash tube;
    a main capacitor storing electricity for firing said flash tube;
    a trigger means for initiating firing of said flash tube;
    a light receiving means for receiving light reflected from an object or a scene;
    an automatic flash light control means for generating a stop signal for stopping the firing of said flash tube when integration of the light received by said light receiving means reaches a predetermined level;
    a detection means for generating a detection signal when said main capacitor is charged to a predetermined level;
    a flash readiness signal generating means for generating a flash readiness signal in response to said detection signal;
    a flash light control termination signal generating means for generating a flash light control termination signal in response to said stop signal for a given period of time; and
    a terminal connected to said flash readiness signal generating means and said flash light control termination signal generating means for transmission of said flash readiness signal and said flash light control termination signal,
    said camera comprising:
    a terminal connectable to said terminal of said electronic flash device;
    an automatic exposure control means capable of automatic shutter speed control in a daylight photography mode and a flash photography mode, said flash readiness signal and said flash light control termination signal, when transmitted to said terminal of said camera, causing said automatic exposure control means to effect automatic shutter speed control in the flash photography mode; and
    a flash light control termination signal interrupting means for generating an interrupting signal at said terminal of said camera in response to a camera release operation,
    wherein said electronic flash device further comprises a control means for causing said flash light control termination signal generating means to interrupt the generation of said flash light control termination signal in response to said interrupting signal transmitted to said terminal of said electronic flash device.

2. A flash photography system as defined in claim 1, wherein said camera further comprises an indication means for indicating said flash readiness signal and said flash light control termination signal.

3. A flash photography system as defined in claim 2, wherein said flash readiness signal and said flash light control termination signal are distinguishably different in frequency, and wherein said indication means includes a single indicating element.

4. A flash photography system as defined in claim 1, wherein said camera further comprises a synchronous switch closed in synchronization with shutter full opening, and a terminal connected to said synchronous switch, and wherein said electronic flash device further comprises a terminal connectable to said terminal connected to said trigger means and said synchronous switch so that the closure of said synchronous switch causes said trigger means to initiate the firing of said flash tube.

5. A flash photography system including an electronic flash device and a camera, said electronic flash device comprising;
   a flash tube;
   a main capacitor storing electricity for firing said flash tube;
   a trigger means for initiating firing of said flash tube;
   a light receiving means for receiving light reflected from an object or a scene;
   an automatic flash light control means for generating a stop signal for stopping the firing of said flash tube when integration of the light received by said light receiving means reaches a predetermined level;
   a detection means for generating a detection signal when said main capacitor is charged to a predetermined level;
   a flash readiness signal generating means for generating a flash readiness signal in response to said detection signal;
   a flash light control termination signal generating means for generating a flash light control termination signal in response to said stop signal for a given period of time; and
   a terminal connected to said flash readiness signal generating means and said flash light control termination signal generating means for transmission of said flash readiness signal and said flash light control termination signal,
   said camera comprising:
   a terminal connectable to said terminal of said electronic flash device;
   an indication means for indicating in response to said flash readiness signal and said flash light control termination signal; and
   a flash light control termination signal interrupting means for generating an interrupting signal at said terminal of said camera,
   wherein said electronic flash device further comprises a control means for causing said flash light control termination signal generating means to interrupt the generation of said flash light control termination signal in response to said interrupting signal transmitted to said terminal of said electronic flash device.

6. An electronic flash device comprising:
   a flash tube;
   a main capacitor storing electricity for firing said flash tube;
   a trigger means for initiating firing of said flash tube;
   a light receiving means for receiving light reflected from an object or a scene;
   an automatic flash light control means connected to said light receiving means for generating a stop signal for stopping firing of said flash tube when integration of the light received by said light receiving means reaches a predetermined level;
   a detection means for generating a detection signal when said main capacitor is charged to a predetermined level;
   a flash readiness signal generating means for generating a flash readiness signal in response to said detection signal for a given period of time;
   a flash light control termination signal generating means for generating a flash light control termination signal in response to said stop signal for a given period of time;
   a first terminal connected to said flash readiness signal generating means and said flash light control termination signal generating means for transmission of said flash readiness signal and said flash light control termination signal from said electronic flash device; and
   a first control means for causing said flash light control termination signal generating means to interrupt the generation of said flash light control termination signal when a potential at said first terminal is changed to a predetermined level during the generation of said flash light control termination signal.

7. An electronic flash device as defined in claim 6, wherein said flash readiness signal and said flash light control termination signal are distinguishably different in frequency.

8. An electronic flash device as defined in claim 7, further comprising a second terminal connected to said trigger means, said trigger means is adapted to initiate the firing of said flash tube with said second terminal grounded.

9. An electronic flash device as defined in claim 8, further comprising a second control means for causing said flash readiness signal generating means to interrupt the generation of said flash readiness signal in response to said stop signal until the interruption of the generation of said flash light control termination signal by said first control means.

* * * * *